United States Patent [19]

Menzl et al.

[11] 4,048,094

[45] Sept. 13, 1977

[54] REACTIVATION OF HYDROTREATING CATALYST BY OPERATING AT A TEMPERATURE IN EXCESS OF NORMAL OPERATING TEMPERATURE

[75] Inventors: Roland L. Menzl, Hammond, Ind.; P. Donald Hopkins, St. Charles, Ill.

[73] Assignee: Standard Oil Company (Indiana), Chicago, Ill.

[21] Appl. No.: 716,716

[22] Filed: Aug. 23, 1976

Related U.S. Application Data

[63] Continuation-in-part of Ser. No. 527,827, Nov. 27, 1974, abandoned.

[51] Int. Cl.$^2$ .................. B01J 23/94; C10G 43/02; C10G 23/02
[52] U.S. Cl. .................................. 252/414; 208/27; 208/264; 252/416; 252/419
[58] Field of Search ............... 252/414, 416, 419; 208/27, 216, 264

[56] References Cited

U.S. PATENT DOCUMENTS

| | | | |
|---|---|---|---|
| 2,813,835 | 11/1957 | Nozaki | 252/416 |
| 2,963,419 | 12/1960 | Holm et al. | 252/416 |
| 3,076,755 | 2/1963 | Stark et al. | 252/416 |
| 3,089,841 | 5/1963 | Berkowitz et al. | 208/27 |
| 3,228,875 | 1/1966 | Demeester | 208/264 |
| 3,532,619 | 10/1970 | Rees et al. | 208/27 |
| 3,565,820 | 2/1971 | Loons, Jr. et al. | 252/414 |
| 3,953,321 | 4/1976 | Ganster et al. | 208/216 |

FOREIGN PATENT DOCUMENTS

| | | | |
|---|---|---|---|
| 1,021,966 | 3/1966 | United Kingdom | 252/419 |

*Primary Examiner*—Patrick P. Garvin
*Assistant Examiner*—P. E. Konopka
*Attorney, Agent, or Firm*—Frank J. Sroka; Arthur G. Gilkes; William T. McClain

[57] ABSTRACT

A method for reactivating the catalyst used in the mild hydrotreating of petroleum crude scale wax comprises contacting the catalyst with the feedstream at a temperature in excess of the normal operating temperature for the particular feedstream for a time sufficient to reactivate the catalyst and produce effluent having satisfactory color and stability characteristics. Operation at a temperature in excess of the normal operating temperature may follow conventional air-steam catalyst regeneration.

3 Claims, No Drawings

REACTIVATION OF HYDROTREATING CATALYST BY OPERATING AT A TEMPERATURE IN EXCESS OF NORMAL OPERATING TEMPERATURE

RELATED APPLICATIONS

The application is a continuation-in-part of U.S. Ser. No. 527,827, filed Nov. 27, 1974, now abandoned.

BACKGROUND OF THE INVENTION

Through the years numerous refining methods for lubricating oils have been used. Many of these include low-pressure fractionation, solvent extraction, solvent dewaxing, acid treating, and clay treating. Such lubricating-oil treatments are discussed in Kirk-Othmer "Encyclopedia of Chemical Technology," volume 10, The Interscience Encyclopedia, Inc., New York, pp. 54–61 (1966).

More recently, hydrotreating has been used as a means for improving the quality of both raw lubricating-oil stocks and waxes. Such hydrogenation processes have been used generally to improve the color and stability of the oil or wax.

Catalysts employed in the hydrogenation of liquid hydrocarbons become contaminated over a period of time with combustible carbonaceous impurities, thereby resulting in a serious decrease in the activity of the catalyst. The deposition of carbonaceous material on the catalyst is particularly pronounced in the case of catalysts used in hydrotreating of heavy hydrocarbon oils. When the activity of the catalyst has declined to an undesirably low level, the activity of the catalyst may be restored to a considerable degree by burning the carbonaceous contaminants thereon. Procedures for regenerating deactivated hydrogenation catalyst have generally involved contacting the catalyst particles with steam and molecular oxygen at elevated temperatures.

Unfortunately, high temperature steam-oxygen regeneration operations sometimes result in serious side effects, such as sintering of the carrier, e.g., alumina, and sublimation or migration of the metallic components of the catalyst. Furthermore, such catalyst regeneration often requires an unduly long period of time to restore the activity of the catalyst to the desired level. Thus, high temperature steam-oxygen regeneration operations have a number of serious drawbacks. The current invention overcomes these disadvantages.

SUMMARY OF THE INVENTION

This invention relates to the hydrotreating of petroleum feedstocks by mild hydrogenation in the presence of a suitable catalyst and hydrogen to obtain products of high quality. More particularly, it relates to the reactivation of the catalyst used in the mild hydrotreating of a lubricating oil or especially unfinished petroleum crude scale wax.

It has been discovered that, after a hydrotreating catalyst has lost activity for finishing lubricating oils and petroleum waxes, catalyst activity can be improved by contacting the catalyst with the feedstream at a temperature from about 25° F. to about 200° F. in excess of the normal operating temperature for the feedstream. Such contacting at a temperature in excess of the normal operating temperature may be preceded by conventional air-steam catalyst regeneration. The contacting is conducted for a period of time sufficient to restore the ability of the catalyst to produce a product of good color when the hydrotreating is later carried out at the normal operating temperature.

DESCRIPTION AND PREFERRED EMBODIMENT

The hydrotreating process is applicable to any unfinished lubricating oil fraction or petroleum wax. The lubricating oil fractions contemplated are lube fractions that have been refined by any method, including solvent refining and acid treating. They may or may not be dewaxed before finishing. In many cases, when decolorized wax is also desired, it is contemplated to hydrogenate the wax-containing lubricating oil fraction and to dewax subsequently. The oils can have Saybolt Universal viscosities (SUS) ranging from about 55 seconds at 100° F. to about 300 seconds at 210° F. and can come from various types of crude sources.

The waxes that can be treated by the process of this invention are the usual waxes found in petroleum. Of particular interest, however, are the paraffin waxes of various melting points, microcrystalline wax, and petrolatum stocks.

One wax of interest for hydrotreating is unfinished crude scale wax. Dewaxing a distillate produces slack wax having an oil content of 5–50 weight percent. Much of this oil is removed by a process called sweating wherein a solidified mass of slack wax is slowly heated and low melting components are allowed to drip away from the wax cake. The material of reduced oil content after the first sweating is called crude scale wax.

Generally heavier, more highly contaminated and darker colored residual petroleum feedstocks require more severe hydrogenation conditions for effective decolorization. Lubricating oils other than the heavy lubes usually require mild conditions while heavy lubes require more severe processing. Waxes require relatively severe processing because of the stringent specifications set for these types of products. Hydrogenation severity is controlled by catalyst type, hydrogen pressure, reaction temperature and feed space velocity. Commonly, different feedstocks are run over a particular catalyst type at different operating temperatures. Process conditions are chosen to give the desired decolorization without rapid catalyst deactivation and without bringing about more fundamental changes in hydrocarbon structure, as by cracking, isomerization, and the like. Economic considerations are also a primary factor.

According to one modification of hydrotreating, a substantially inert diluent oil may be added to the feedstream. Suitable diluent oils include for example light mineral oil fractions, kerosene, jet fuel fractions and the like. The principal function of the diluent is to lower the viscosity of the feeds, thereby improving diffusion rates. It may also increase the solubility of hydrogen in the liquid feed. Moreover, vaporization of the diluent in the reactor may assist in providing additional agitation with resultant improved contacting efficiency. Particularly preferred diluents are those boiling in the kerosene range.

Hydrotreating is generally used to improve product color and stability. The stability of lubricating oils and waxes can be measured by a number of different means. In the Accelerated Oxidation Stability test, 1 pound of paraffin wax is aerated for 8 hours at 275° F. at 600 ml per minute and then the peroxide number of the wax is determined by ASTM D 1832. Deterioration of petroleum wax results in the formation of peroxides and other oxygen carrying compounds. The peroxide number gives an indication of the quantity of oxidizing constituents present.

Another type of stability test, exposes a wax bar, which is wrapped for half its length in aluminum foil, to a General Electric Sunlamp. The top of the wax sample is held 15 inches from the bottom of the 275 watt bulb. After 5 hours the aluminum foil is removed and the sample allowed to cool for 45 minutes. The color of the exposed portion of the bar is then compared with the portion that was foil wrapped; definite color differences indicate instability.

But instead of measuring stability by tests such as these, it is much easier to use product color as a measure of hydrogenation effectiveness. In some products, the hydrogenation processing is carried out entirely to improve color. Saybolt color can be easily determined by ASTM D 156. A wax or lubricating oil which is hydrotreated to a good color would be expected to also have good stability.

Hydrotreating employs a suitable hydrogenation catalyst, for example, metals having hydrogenation activities and certain compounds of such metals. Such metals may be selected from the Sixth and Eighth Groups of the Periodic Table and the oxides, sulfides or mixtures thereof. Typical catalysts for such hydrotreating are nickel-tungsten sulfide, cobalt molybdate, nickel molybdate, cobalt sulfide, molybdenum sulfide, cobalt oxide, molybdenum oxide, and combinations thereof. These catalytic materials are generally supported on a suitable carrier or support, such as alumina, magnesia, silica, or silica-alumina.

The preferred catalyst for the process is a conventional cobaltmolybdenum hydrogenation catalyst which comprises the oxides and/or sulfides of cobalt and molybdenum on an alumina support. A typical example of such a catalyst would contain from about 2 to 4 percent by weight cobalt, calculated as the oxide, and from 10 to 15 percent by weight molybdenum, calculated as molybdenum trioxide. Such catalysts and their preparation are well known in the art. Prior to its use in the hydrogenation of lubricating oils, the catalyst may be activated by subjecting it to a sulfiding treatment.

In order to be effective for decolorizing lubricating oils or waxes, the alumina carrier of a cobalt-molybdenum-on-alumina catalyst must have a pore diameter greater than about 50 Angstrom units (A.) and up to about 600 A., preferably greater than about 80 A., and up to about 250 A. The pore diameter of the alumina can be adjusted by calcining for controlled periods of time, as those skilled in the art will readily appreciate, or by other known means of adjusting alumina surface area. The amount of cobalt-molybdenum oxides that is included in the catalyst can vary between about 5 percent and about 20 percent, by weight. The incorporation of the cobalt-molybdenum can be done by any of the means well known in the art for preparing supported cobalt-molybdenum catalysts.

It is known that as a lubricating oil or petroleum wax is being hydrofinished under mild hydrogenation conditions, the color of the resultant product darkens as time on oil proceeds. Other properties such as odor and stability also deteriorate. In common commercial practice, the typical catalyst is regenerated by conventional air-steam regeneration when product specification cannot be met.

Air-steam regeneration can be conducted at various conditions of temperature, pressure and oxygen concentration. Generally air-steam regeneration is conducted at a temperature from about 750° F. to about 1050° F. with steam containing from about 0.2 to about 4 volume percent oxygen. One method passes steam at approximately 750° F. and 1 volume percent oxygen over the deactivated catalyst. The regeneration is controlled so that a flame front will pass down through the catalyst bed. This procedure is continued until a flame front has passed through all the catalyst. Preferably, the temperature at any particular point in the catalyst bed is not to exceed 1050° F. in order to prevent localized overheating of the catalyst.

Subsequent to such regeneration, the hydrotreating process effluent quality is often poor in both odor and color. We have found that contacting the catalyst with the feedstream at an elevated temperature for a period of time subsequent to conventional air-steam catalyst regeneration is beneficial in restoring the ability of the catalyst to produce a product of good color and odor. It is preferred that the contacting be carried out from 25° to about 200° F., more preferably about 25° to about 100° F., above the normal operating temperature for the feedstream. At temperatures less than 25° F. in excess of the normal operating temperature, little reactivation is observed. At temperatures above 200° F. in excess of the normal operating temperature, excessive cracking and other undesired reactions have deleterious effects on the catalyst.

Lubricating oil and petroleum waxes are generally hydrotreated within a range from about 500° F. to about 800° F. and a hydrogen partial pressure within the range from about 500 to about 2500 psia. A typical hydrogenation process which could use our invention would be the one described in U.S. Pat. No. 3,382,168. An example of such a hydrogenation process uses the following conditions: a 1/16-inch extruded cobalt-molybdenum-on-alumina catalyst, a temperature within the range from about 500° F. to about 695° F., preferably, from 550° F. to about 650° F., a liquid hourly space velocity (LHSV) within the range from about 0.25 to about 5.0 volumes of hydrocarbon per hour per volume of catalyst, preferably, from 0.5 to 1.0 volume of hydrocarbon per hour per volume of catalyst; a hydrogen partial pressure within the range from about 500 to 1200 psia, preferably from 700 to 900 psia; a hydrogen consumption within the range from about 10 standard cubic feet of hydrogen per barrel of hydrocarbon (SCFB) to about 300 SCFB, preferably, from 20 to 250 SCFB; and a hydrogen flow to the reactor within the range from about 50 to about 1000 SCFB, preferably, from 200 to 800 SCFB. Such hydrogenation may be conducted in one or more stages.

EXAMPLE

Various tests were performed to demonstrate those conditions which will provide satisfactory reactivation of hydrogenation catalyst finishing of the lubricating oil and petroleum wax being treated. These tests were performed in an automated, continuous-flow hydrogenation unit. In this unit, a mixed stream of the hydrocarbon feedstock to be hydrogenated and once-through, substantially-dried hydrogen was introduced into the top of the reactor. The hydrogen, prior to its mixing with the hydrocarbons, was metered by a Jerguson-gauge-bubble-flow meter. The mixed hydrogen and hydrocarbons were trickled down through a bed of cobaltmolybdenum hydrogenation catalyst within the reactor. Reactor effluent was cooled by a water-cooled condenser. The residence time of the hot hydrogenated product did not exceed 3 minutes. Cooled effluent was conducted into a Jerguson separator, where the hydrogen was separated from the rest of the effluent. Additional light material, hydrogen sulfide, water, and ammonia were removed from the effluent in a stripper column and vented. The stripped product was then collected in a product receiver that was heated and nitrogen-blanketed. Nitrogen was used as the stripping medium, and the temperature and nitrogen rate of the stripper were regulated to provide flash specification products. The stripper bottoms stream was discarded for an interval designated as the line-out period.

1/16 inch cobalt-molybdenum-on-alumina catalyst was loaded into the reactor so that the bottom of the bed was maintained at approximately the same positions for all tests. The catalyst bed was supported by a 2-inch layer of 6-millimeter glass beads, which, in turn, was supported by a 10-mesh, stainless-steel screen and the bottom closure of the reactor. The reactor was 2.5 feet long and had an inside diameter of 1.5 inches. If the catalyst bed were composed of 400 ccs. of catalyst, the bed would be approximately 14 inches long. The catalyst was charged to the reactor by slowly pouring it with gentle tapping into the top of the reactor. Immediately above the catalyst, 6-millimeter glass beads were placed; and this glass-bead section was extended to within an inch of the top closure of the reactor. This catalyst was an extrudate and contained 3.4 weight percent cobalt oxide and 13.4 weight percent molybdenum oxide and 1.0 weight percent sodium oxide on an alumina carrier. The catalyst was calcined at 900° to 1000° F. for a period of 2 to 4 hours prior to a sulfiding pretreatment. This sulfiding pretreatment was carried out in situ for 16 hours with an 8-mol percent hydrogen sulfide, 92 mol percent hydrogen gas mixture. This gas mixture was introduced from gas cylinders and was added at a rate of 1.0 standard cubic feet per hour per liter of catalyst. The temperature during this sulfiding pretreatment was maintained at 400° F.

Various petroleum wax feeds were hydrotreated over a period of time until product color was poor due to catalyst deactivation. The catalyst was then regenerated by bringing catalyst temperature up to about 750° F. with nitrogen flow and introducing steam at a rate of 2.5 cc water/hr/cc catalyst. Sufficient air was injected into the steam to establish a flame front of about 900° F. traveling through the catalyst. This air was approximately 1 volume percent of the steam. After the flame front had passed through the catalyst bed, regeneration was completed.

After catalyst air-steam regeneration, the catalyst was sulfided by treatment with a gas mixture consisting of approximately 8 mol-percent hydrogen sulfide in hydrogen. The catalyst was treated with this gas overnight at atmospheric pressure and a temperature of 400° F. The gas flow rate was 1.0 cubic feet per hour.

After the sulfiding step untreated crude scale having a melting point of 142° F. was hydrotreated at a hydrogen partial pressure of 1600 psia, a normal operating temperature of 600° F., a liquid hourly space velocity of 0.47 volume of hydrocarbon per hour per volume of catalyst, and a hydrogen addition rate of 850 SCFB. After four days on-stream, the temperature was increased to 675° F. for 24 hours, then returned to the normal operating temperature of 600° F. Total reactor effluent over a particular time interval was used for testing purposes. For example, reactor effluent taken from 12-19 hours after regeneration was used as one sample. The results obtained from inspections made on these hydrotreating effluent samples can be seen in Table I.

Saybolt color of effluent wax was determined by the ASTM D 156 method. In this method, the height of a column of sample is decreased until the color of the sample is unmistakably lighter than that of a glass standard. The depth of the sample at this point corresponds to a color number. The numbers range from the lightest color of 30+ to the darkest color of −16. Odor was judged qualitatively, an unpleasant odor being bad while a slight hydrocarbon odor is good.

Table I

| Stream Hours Since Regeneration | 12-19 | 67-91 | 91-115 | 132-139 |
|---|---|---|---|---|
| Temperature ° F. | 600 | 600 | 675 | 600 |
| IHSV | 0.48 | 0.47 | 0.47 | 0.47 |
| Hydrogen Partial Pressure, psia | 1600 | 1600 | 1600 | 1600 |
| Hydrogen, SCFB | 825 | 850 | 850 | 850 |
| Product Saybolt Color | +21 | +26 | 30+ | 30+ |
| Odor | Poor | Poor | Good | Good |

After steam-air regeneration, the hydrotreating operation was started at the normal operating temperature of 600° F. After 12-19 hours onstream, the product wax had poor color and an unpleasant odor. After 4 days both product color and odor were still off-specification. The operating temperature was increased to 675° F. and maintained at that level for one day. During this period the color and odor were good, but excessive cracking due to the increased temperature raised the oil content of the wax. After the temperature was lowered to 600° F., wax of good color and odor was produced.

Four days' operation after start-up, product color and odor were off-specification with no assurance that good quality product would soon be produced. But after raising the operating temperature to 675° F. and maintaining it at that level for 24 hours, subsequent hydrotreating at the normal temperature of 600° F. produced good product. This was an unexpected result.

These results show that the catalyst used to hydrotreat petroleum waxes or lubricating oils can be reactivated for use by contacting the deactivated catalyst with the feedstream at a temperature in excess of the normal operating temperature for that feedstream.

The foregoing example and specification clearly demonstrates a method for partially restoring the activity of a hydrogenation catalyst used in the hydrotreating of petroleum waxes or lubricating oils. The example is presented for illustration only and is not intended to limit our invention.

We claim:

1. A process for the reactivation of deactivated catalyst used in the hydrotreating of a hydrocarbon feedstream, which hydrotreating is conducted within a temperature range from about 500° F. to about 800° F. and a hydrogen partial pressure within the range from about 500 to about 2500 psia, wherein the catalyst comprises a Group VIa and Group VIII metal on a solid porous refractory oxide support of alumina having a pore diameter greater than about 80 A. and up to about 250 A, and wherein said feedstream comprises unfinished petroleum crude scale wax, which process comprises first contacting said catalyst with a mixture of steam containing about 0.2 to about 4 volume percent oxygen at a temperature of about 750° F. to about 1050° F. in a conventional air-steam catalyst regeneration, and then contacting said catalyst with said hydrogen and feedstream at a temperature from about 25° F. to about 200° F. in excess of the normal operating temperature that would be used for said hydrotreating stream, said contacting being conducted for a time that is sufficient to reactivate said catalyst.

2. The process of claim 1 wherein the feedstream contacting temperature is about 25° F. to about 100° F. above the normal operating temperature for said feedstream.

3. The process of claim 1 wherein the catalyst consists essentially from about 2 to about 4 weight percent cobalt oxide and from about 10 to about 15 weight percent molybdenum oxide on said alumina base.

* * * * *